United States Patent [19]

Ergenc et al.

[11] 4,038,035
[45] July 26, 1977

[54] APPARATUS FOR ENRICHING HYDROGEN WITH DEUTERIUM

[75] Inventors: Mehmet Sahabettin Ergenc, Zollikerberg; Charles Mandrin, Winterthur, both of Switzerland

[73] Assignee: Sulzer Brothers Limited, Winterthur, Switzerland

[21] Appl. No.: 472,053

[22] Filed: May 21, 1974

[30] Foreign Application Priority Data

May 24, 1973    Switzerland .................... 7403/73

[51] Int. Cl.² ............... B01J 8/02; B01J 8/08; C01B 4/00; C01B 5/02
[52] U.S. Cl. .................. 23/260; 23/288 R; 23/298 E; 23/288 H; 423/648 A
[58] Field of Search ............ 423/648 US, 648; 23/288 R, 260, 288 E, 288 H

[56] References Cited

U.S. PATENT DOCUMENTS

| | | | |
|---|---|---|---|
| 2,676,875 | 4/1954 | Barr | 23/288 R |
| 3,126,267 | 3/1964 | Arend | 423/648 X |
| 3,437,442 | 4/1969 | Poole | 23/288 R X |
| 3,716,623 | 2/1973 | Bancroft | 423/648 X |
| 3,864,466 | 2/1975 | Trichet et al. | 423/648 |
| 3,907,509 | 9/1975 | Spevack | 423/648 X |

FOREIGN PATENT DOCUMENTS

91,266   10/1961   Denmark .................... 23/260

*Primary Examiner*—Barry S. Richman
*Attorney, Agent, or Firm*—Kenyon & Kenyon, Reilly, Carr & Chapin

[57] ABSTRACT

A flow of hydrogen and steam is first passed into isotope exchange with fresh water of natural deuterium concentration to effect enrichment of the hydrogen with deuterium. Thereafter, the enriched hydrogen and steam mixture is heated to superheat the steam and the mixture is passed into a reactor and over a suitable catalyst to effect a further isotope exchange. The hydrogen is thus further enriched with deuterium from the superheated steam. The further enriched hydrogen is then delivered to a heavy water recovery plant.

3 Claims, 1 Drawing Figure

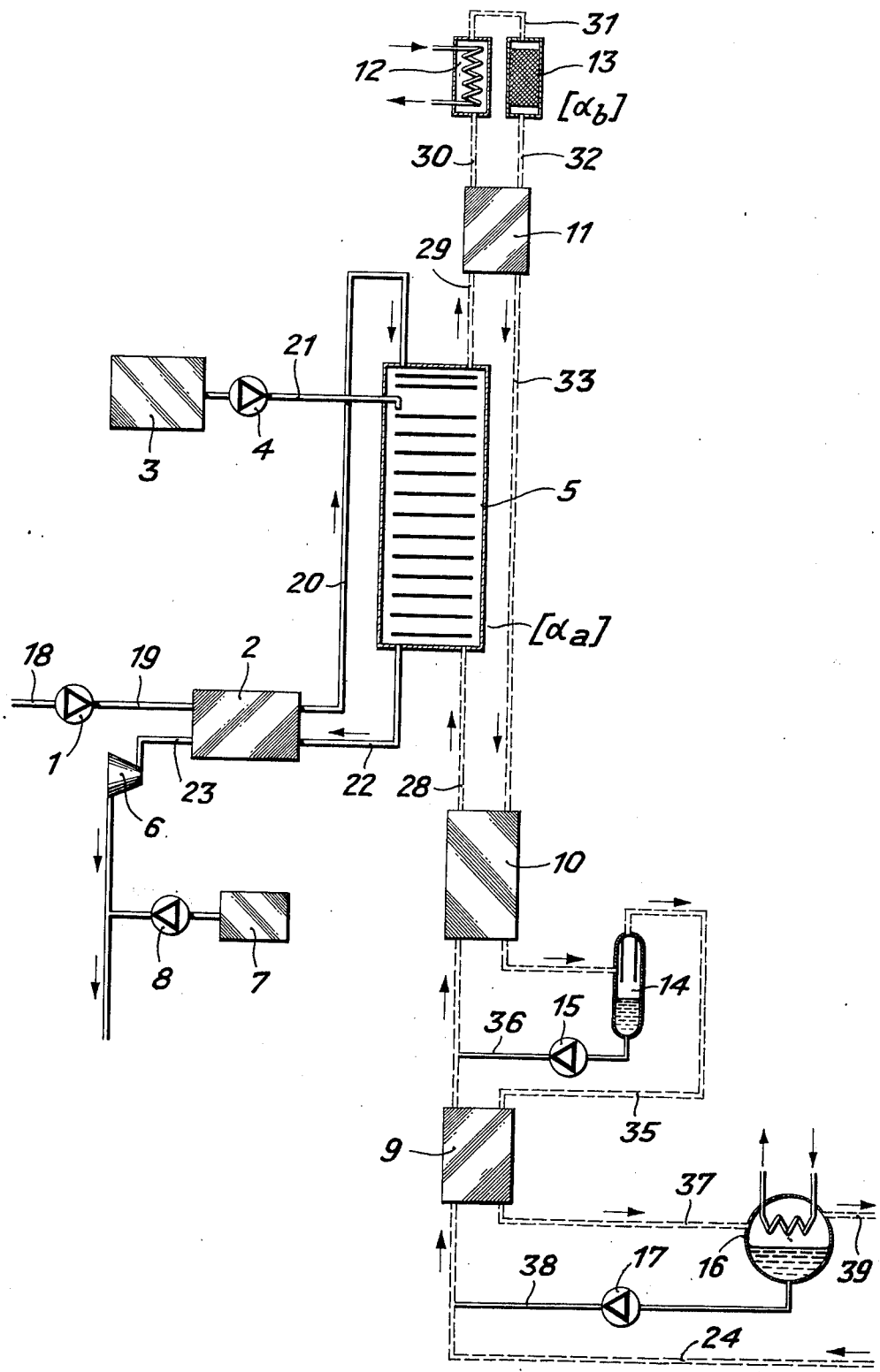

APPARATUS FOR ENRICHING HYDROGEN WITH DEUTERIUM

This invention relates to a process and apparatus for enriching hydrogen with deuterium.

As is known, hydrogen can be enriched with deuterium by isotope exchange with fresh water having a natural deuterium concentration in the presence of a catalyst. The enriched hydrogen can then be introduced into a heavy water recovery plant. Generally, the hydrogen current enriched with deuterium in such processes is fed as the feed current to a heavy water recovery plant in which the deuterium transferred from the water to the hydrogen is withdrawn and is finally processed to form heavy water. The hydrogen current leaves the heavy water recovery plant with a reduced deuterium content and is re-enriched with deuterium from fresh water in the same manner and is recycled to the heavy water recovery plant as the feed current.

Plants in which the deuterium is withdrawn from a hydrogen current, enriched and finally processed to form heavy water are known, so that there is no need to discuss the possible constructions of these plants in detail. These plants operate essentially on an isotope exchange process which may be monothermal or bithermal. These plants may also contain distillation columns.

Of course, the size of such heavy water recovery plants and the energy expenditure for a given heavy water production are substantially inversely proportional to the concentration of the deuterium in the hydrogen feed current.

Accordingly, it is an object of the invention to provide maximum dueterium enrichment of a deuterium-depleted hydrogen feed current.

It is another object of the invention to maximize the deuterium content of a deuterium enriched hydrogen stream in a simple manner.

It is another object of the invention to reduce the size and expense of heavy water plants which receive deuterium enriched hydrogen.

Briefly, the invention provides a process and apparatus for enriching hydrogen with deuterium. The process comprises the steps of passing a first flow of fresh water of natural deuterium concentration into isotope exchange relation with a second flow of hydrogen and steam in the presence of a catalyst to enrich the hydrogen with deuterium while depleting the flow of fresh water of deuterium, thereafter heating the second flow to heat the enriched hydrogen and to superheat the steam and subsequently bringing the enriched hydrogen and superheated steam into isotope exchange relation in the presence of a catalyst to further enrich the hydrogen with deuterium and to deplete the superheated steam of deuterium.

In one advantageous embodiment of the process, before the isotope exchange with water, the hydrogen is wetted with water condensed out of the hydrogen/steam mixture; the water originating from the superheated steam participating in the second isotope exchange reaction.

Also, advantageously, prior to the isotope exchange between the superheated steam and the enriched hydrogen, the hydrogen brought into isotope exchange with the catalyst-containing water is brought into contact with the water supplied to the isotope exchange in a washing column in order to wash the catalyst out of the hydrogen/steam mixture.

The apparatus includes at least one isotope exchange column, a means for passing a first flow of fresh water of natural deuterium concentration into the column and a means for passing a second flow of hydrogen and steam into the column into isotope exchange relation with the first flow to enrich the hydrogen of the second flow with deuterium while depleting the first flow of deuterium. In addition, the apparatus includes at least one heating means downstream of the exchange column relative to the direction of flow of the second flow for heating the second flow to heat the enriched hydrogen and superheat the steam. Also, at least one reactor is positioned downstream of the heating means relative to the direction of flow of the second flow for receiving the heated hydrogen and superheated steam. This reactor houses a catalyst for effecting an isotope exchange between the heated hydrogen and superheated steam to further enrich the hydrogen with deuterium and to deplete the superheated steam of deuterium.

The heating means used to superheat the steam can be a heat exchanger which receives the initially enriched hydrogen and superheated steam from the exchange column and the further enriched hydrogen and depleted superheated steam from the reactor in counterflow relation and further a heat exchanger in which the hydrogen-steam mixture is heated by indirect heat exchange with a heat-yielding medium, for example, hot gas.

In addition, a condensor can be positioned downstream of the reactor to condense water from the superheated steam for use in wetting the hydrogen prior to passage into the exchange column. In this instance, a heating means is provided to heat the water to steam prior to passage into the exchange column.

These and other objects and advantages of the invention will become more apparent from the following detailed description and appended claims taken in conjunction with the accompanying drawing in which:

The drawing illustrates a schematic view of an apparatus constructed in accordance with the invention.

Referring to the drawing, the apparatus includes a countercurrent isotope exchange column 5, such as a perforate tray column, which receives a flow of prepared fresh water, i.e. purified and de-gassed water of natural deuterium concentration. The water is fed from a suitable source (not shown) via a conduit 18 containing a pump 1 for pumping the water and a conduit 19 to a countercurrent heat exchanger 2 and is heated therein. A conduit 20 connects the heat exchanger 2 to an upper end of the exchanger column 5 in order to pass the heated water flow in a downward direction through the exchange column 5.

A deuterium-depleted dry hydrogen which is to be enriched is taken from a heavy water recovery plant (not shown) via a conduit 24 and is heated in two serially connected heating means such as countercurrent heat exchangers 9, 10 upstream of the exchange column 5. In addition, a condensor 16 in which condensed water is received is connected via a means such as a conduit 38 containing a pump 17 to a point upstream of the first heat exchanger 9 to deliver water into the hydrogen flow to wet the hydrogen. The heat exchanger 9 thus serves to heat the water to steam. In a similar manner, a separator 14 in which separated water is received is connected via a conduit 36 containing a pump 15 to point between the heat exchangers 9, 10 to deliver water into the hydrogen and steam mixture.

A conduit 28 connects the heat exchanger 10 to the exchange column 5 to pass a flow of hydrogen and steam into the column 5 in an upward direction for counter-current flow relative to the flow of water introduced via the conduit 20. In addition, a tank 3 containing a catalyst is connected via a means, such as a conduit 21 containing a pump 4, to the exchange column 5 at a point downstream of a number of exchange trays of the column 5. The pump 4 serves to deliver sufficient catalyst to the column 5 to effect an isotope exchange between the two flows to enrich the hydrogen with deuterium while depleting the deuterium of the water.

A conduit 22 is connected at the lower end of the column 5 to expel the water which is depleted in deuterium by isotope exchange. The conduit 22 connects with the heat exchanger 2 in order to heat the counterflowing fresh water passing through the heat exchanger 2 with some of the sensible heat contained in the spent water. The heat exchanger 2 is also connected over a conduit 23 to an expansion turbine 6 to deliver the spent water thereto in order to recover some of the pressure energy. This is possible because the plant operates at a relatively high pressure.

A corresponding amount of an acid is mixed with the water leaving the expansion turbine, the acid being obtained from a tank 7 by means of a pump 8, in order to neutralize the catalyst, e.g. NaOH or KOH, contained in the water. The water is then discharged into the open, for example a river or lake.

A conduit 29 connects the upper end of the exchange column 5 to a heating means such as a countercurrent heat exchanger 11 which serves to heat the deuterium enriched hydrogen and to superheat the steam passing from the column 5. A conduit 30 connects the heat exchanger 11 to a heater 12 in which the hydrogen-steam mixture is heated further by indirect heat exchange with a heat-yielding medium, for example, hot gas. This heater 12 is connected via a conduit 31 to a reactor 13 housing a catalyst, for example platinum or nickel, which is suitable to effect an isotope exchange between the gaseous hydrogen and steam. The reactor 13 connects via a conduit 32 to the heat exchanger 11 to deliver the hydrogen-steam mixture thereto for heat exchange with the mixture passing from the column 5. A conduit 33 connects the heat exchanger 11 to the heat exchanger 10 in order to supply heat for heating the water in the hydrogen flow to steam prior to delivery to the exchange column 5.

As shown, the water separator 14 is interposed in a conduit 35 between the heat exchangers 10, 9 in order to separate out any water from the flowing mixture of hydrogen and steam. In a similar manner, the condensor 16 is interposed in a conduit 37 leading from the heat exchanger 9 in order to condense the steam into water. A delivery conduit 39 is connected to the condensor 16 and leads to the heavy water recovery plant (not shown) in order to deliver the deuterium enriched hydrogen thereto.

In operation, with fresh water and a catalyst being fed into the exchange column 5, a flow of hydrogen is delivered via the conduit 24. This flow of hydrogen is first wetted with water from the condensor 16 via the pump 17 and then heated. Additional water is added to the heated mixture from the separator 14 and the mixture is heated in the heat exchanger 10 to heat the water to steam. Although other techniques can be used to wet the hydrogen, the described technique is advantageous from the point of view of heat economy, since the condensation heat is utilized directly to evaporate the water entrained by the hydrogen, and on the other hand water which has already been prepared, i.e. purified and degassed, is used for wetting the hydrogen current. The wetted and heated hydrogen now via the conduit 28 to the isotope exchange column 5 in which the hydrogen becomes enriched with deuterium and leaves the column via the conduit 29 with a vapor content corresponding to the operating temperature and operating pressure. The mixture then flows to the countercurrent heat exchanger 11 in which the hydrogen is heated and the steam contained in the mixture is superheated.

Thereafter, the hydrogen-steam mixture passes through the heater 12 for additional heating and then enters the reactor 13. An isotope exchange takes place in which the hydrogen is further enriched with deuterium from the super-heated steam while the steam deuterium content is depleted.

The mixture leaves the reactor 13 with chemical equilibrium substantially established and is then fed via the conduit 32 to the countercurrent heat exchanger 11 and then via the conduit 33 to the heat exchanger 10, the mixture cooling in countercurrent with the current fed to the isotope exchange column 5 and the reactor 13. This mixture cools in the heat exchanger 10 to such an extent that some of the steam contained therein condenses out and is separated in the separator 14 and is added in the manner described above to the hydrogen gas current for enrichment. The remainder of the mixture containing all the enriched hydrogen is fed via the conduit 35 from the separator 14 to the countercurrent heat exchanger 9 in which the mixture is cooled further in countercurrent with the hydrogen current for enrichment and more of the steam is liquified.

The mixture consisting of purified hydrogen, the remaining steam and water droplets, is fed to the condensor 16 from the heat exchanger 9 via the conduit 37. The purpose of this condensor 16 is to condense out and separate the rest of the steam as far as possible. To this end, the condensor is conventionally fed with a cooling medium. The condensate is withdrawn via the conduit 38 and added as described above to the hydrogen current for enrichment. The enriched hydrogen from which most of the water has been separated is withdrawn from the condensor 16 via the conduit 39 and is fed as the feed current to a heavy water recovery plant (not shown).

Since the catalyst in the column 5 would act as a poison for the catalyst of the reactor 13, the upwardly flowing hydrogen/steam mixture in the column 5 is washed out by means of fresh water in the zone between the points of entry of the fresh water and the catalyst, i.e. the catalyst-containing water droplets entrained by the upwardly flowing mixture are removed from the mixture. To this end, a washing means is provided by a number of uppermost trays in the column 5. Of course, the washing means may be constructed as a separate washing column from the isotope exchange column 5 and be constructed in one or more stages.

NUMERICAL EXAMPLES

Physical Bases of the Deuterium Exchange Process

The exchange process is governed by the separation factor ($\alpha$), which is a magnitude suitable for technical use, being derived directly from the chemical equilibrium constant.

The chemical reactions in the present case are as follows:

$$(H_2O)_{fl} + (HD)_g \rightleftarrows (HDO)_{fl} + (H_2)_g \quad (a)$$

$$(H_2O)_v + (HD)_g \rightleftarrows (HDO)_v + (H_2)_g \quad (b)$$

where
index
$fl$ = liquid
$g$ = gas
$v$ = vapor

The associated separation factors are ($\alpha\ a$) and ($\alpha\ b$). Definition of separation factor:

$$\alpha\ a = \frac{(N_D/N_H)fl}{(N_D/N_H)g} = \frac{x}{Y_H}$$

$$\alpha\ b = \frac{(N_D/N_H)v}{(N_D/N_H)g} = \frac{Y_v}{Y_H}$$

$N_D$ = number of deuterium atoms
$N_H$ = number of hydrogen atoms

| | |
|---|---|
| $x = (N_D/N_H)$ fl | The ratio of the deuterium atoms to hydrogen atoms in the water or the deuterium concentration in the water. |
| $Y_v = (N_D/N_H)$ v | The ratio of deuterium atoms to hydrogen atoms in the steam or deuterium concentration in the steam. |
| $Y_H = (N_D/N_H)$ g | The ratio of deuterium atoms to hydrogen atoms in the gaseious hydrogen or deuterium concentration in the gaseous hydrogen. |

The numerical values of $\alpha\ a$ and $\alpha\ b$

| t(° C) | $\alpha$ a | $\alpha$ b |
|---|---|---|
| 50 | 3.44 | — |
| 150 | 2.29 | 2.29 |
| 250 | 1.83 | 1.83 |
| 400 | | 1.50 |
| 500 | | 1.37 |
| 600 | | 1.28 |

| Position as per drawing reference | T [° C] | P [Bar] | Vapor H₂O [Kmol/h] | Gas H₂ [Kmol/h] | $Y_H$ | $Y_V$ | Liquid H₂O [Kmol/h] | NaOH [Kmol/h] (dissolved in the water) | x |
|---|---|---|---|---|---|---|---|---|---|
| 18 | 20 | 1 | | | | | 1.5 | | 1 |
| 19 | 20 | 160 | | | | | 1.5 | | 1 |
| 20 | 276 | 160 | | | | | 1.5 | | 1 |
| 21 | 20 | 160 | | | | | 0.178 | 8 · 10⁻⁴ | 1 |
| 22 | 296 | 160 | | | | | 1.678 | 8 · 10⁻⁴ | 0.65 |
| 23 | 67 | 160 | | | | | 1.678 | 8 · 10⁻⁴ | 0.65 |
| 24 | 40 | 160 | | 1 | 0.1 | | | | |
| 25 | 40 | 160 | 0.00055 | 1 | 0.1 | 0.88 | 0.33251 | | 0.88 |
| 26 | 215 | 160 | 0.151576 | 1 | 0.1 | 0.88 | 0.180934 | | 0.88 |
| 27 | 225 | 160 | 0.189591 | 1 | 0.1 | 0.88 | 0.978309 | | 0.88 |
| 28 | 360 | 160 | 1.1679 | 1 | 0.1 | 0.88 | | | |
| 29 | 296 | 160 | 1.1679 | 1 | 0.5722 | 0.9785 | | | |
| 30 | 426 | 160 | 1.1679 | 1 | 0.5722 | 0.9785 | | | |
| 31 | 600 | 160 | 1.1679 | 1 | 0.5722 | 0.9785 | | | |
| 32 | 600 | 159 | 1.1679 | 1 | 0.6874 | 0.88 | | | |
| 33 | 425 | 159 | 1.1679 | 1 | 0.6874 | 0.88 | | | |
| 34 | 250 | 159 | 0.336 | 1 | 0.6874 | 0.88 | 0.8343 | | 0.88 |
| 35 | 250 | 159 | 0.3336 | 1 | 0.6874 | 0.88 | | | |
| 36 | 250 | 159 | | | | | 0.8343 | | 0.88 |
| 37 | 150 | 159 | 0.037 | 1 | 0.6874 | 0.88 | 0.2966 | | 0.88 |
| 38 | 40 | 159 | | | | | 0.33305 | | 0.88 |
| 39 | 40 | 159 | 0.00055 | 1 | 0.6874 | 0.88 | | | |

All deuterium concentrations are based on the normal concentration of deuterium in natural water.

1 Normal concentration = approx. 150 ppm.
$Y_H$ = Deuterium concentration in hydrogen
$Y_V$ = Deuterium concentration in steam
$x$ = Deuterium concentration in liquid water

What is claimed is:

1. An apparatus for enriching hydrogen with deuterium comprising
at least one isotope exchange column;
means for passing a first flow of fresh water of natural deuterium concentration into and through said column in a first direction;
means for passing a second flow of hydrogen into and through said column in an opposite direction to said first flow;
means for introducing a catalyst into said column to effect an isotope exchange between said flows to enrich the hydrogen with deuterium while introducing steam into said second flow;
at least one heating means downstream of said column relative to said second flow for heating the deuterium enriched hydrogen and superheating the steam;
a reactor means for receiving the enriched hydrogen and superheated steam;
a first conduit connecting an inlet of said reactor means to an outlet of said heating means to receive a flow of the enriched hydrogen and steam from said heating means;
a catalyst in said reactor means for effecting an isotope exchange between the heated hydrogen and superheated steam to further enrich the hydrogen with deuterium;
a second conduit connecting an outlet of said reactor means to an inlet of said heating means to deliver the hydrogen-steam mixture from said reactor means to said heating means;
a condensor downstream of said reactor relative to the flow of the further enriched hydrogen and superheated steam for condensing water from the superheated steam;
means for delivering condensed water from said condensor into said second flow to wet the hydrogen; and a further heating means for heating the water in said second flow to steam prior to passage into said column.

2. An apparatus for enriching hydrogen with deuterium comprising an isotope exchange column;

a pump for pumping water into said isotope exchange column;

a first heat exchanger connected between said pump and said isotope exchange column for heating the water passing therethrough to said isotope exchange column;

a conduit for delivering hydrogen;

at least one second heat exchanger connected to said conduit to receive and heat the hydrogen passing therethrough;

a second conduit connecting said second heat exchanger to said isotope exchange column to deliver heated hydrogen thereto;

a source of catalyst comprising a tank containing a catalyst and connected to said isotope exchange column for delivering catalyst thereto;

a conduit connected at a lower end of said column for expelling water depleted in deuterium from said column;

a source of acid comprising a tank connected to said latter conduit to deliver acid thereto for neutralizing the catalyst therein;

a third heat exchanger connected to said column for heating deuterium enriched hydrogen passing from said column while superheating steam entrained in the hydrogen;

a heater for heating the deuterium enriched hydrogen-steam mixture passing from said third heat exchanger;

a reactor downstream of said heater containing a catalyst therein to effect an isotope exchange between the hydrogen and steam passing therethrough;

a conduit connecting said reactor to said third heat exchanger to supply a hot hydrogen-steam mixture thereto for countercurrent heating of the feed material to said heater; and a conduit connecting said third heat exchanger to said second heat exchanger to feed the hydrogen-steam mixture to said second heat exchanger to transfer heat from the deuterium enriched hydrogen to the hydrogen passing in counterflow in said second heat exchanger to said column.

3. An apparatus as set forth in claim 2 which further comprises a condensor downstream of said second heat exchanger relative to the hydrogen-steam mixture for condensing water from the superheated steam and means for delivering condensed water from said condensor into said conduit for delivering hydrogen to wet the hydrogen therein whereby said second heat exchanger heats the water to steam prior to passage into said column.

* * * * *